(12) United States Patent
Lin et al.

(10) Patent No.: US 7,362,748 B2
(45) Date of Patent: Apr. 22, 2008

(54) IMPLEMENTATION METHOD AND SYSTEM OF THE PERSONAL NUMBER SERVICE THAT SYNCRETIZES THE PHONE NETWORK USER AND IP NETWORK USER

(75) Inventors: Haitao Lin, Shenzhen (CN); Jun Jiao, Shenzhen (CN); Guangrong Li, Shenzhen (CN); Xiaoqin Huang, Shenzhen (CN); Guangsheng Zhang, Shenzhen (CN); Xiaolan Wang, Shenzhen (CN); Shuiyang Chen, Shenzhen (CN); Quan Gan, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 662 days.

(21) Appl. No.: 10/491,317

(22) PCT Filed: Jun. 7, 2002

(86) PCT No.: PCT/CN02/00411

§ 371 (c)(1),
(2), (4) Date: Mar. 29, 2004

(87) PCT Pub. No.: WO03/030465

PCT Pub. Date: Apr. 10, 2003

(65) Prior Publication Data

US 2004/0202150 A1 Oct. 14, 2004

(30) Foreign Application Priority Data

Sep. 29, 2001 (CN) .................................. 01 1 41652

(51) Int. Cl.
*H04L 12/66* (2006.01)

(52) U.S. Cl. ...................................... 370/352; 370/401

(58) Field of Classification Search ........ 370/352–360, 370/362, 401; 379/121.01, 201.02; 709/219, 709/228–230
See application file for complete search history.

(56) References Cited

U.S. PATENT DOCUMENTS

| | | | | |
|---|---|---|---|---|
| 5,991,292 A | * | 11/1999 | Focsaneanu et al. | 370/352 |
| 6,049,712 A | * | 4/2000 | Wallinder | 455/410 |
| 6,185,289 B1 | * | 2/2001 | Hetz et al. | 379/221.08 |
| 6,389,117 B1 | * | 5/2002 | Gross et al. | 379/88.23 |
| 6,430,276 B1 | * | 8/2002 | Bouvier et al. | 379/121.01 |

(Continued)

FOREIGN PATENT DOCUMENTS

KR 2001057106 A 7/2001

(Continued)

*Primary Examiner*—Binh K. Tieu (57) ABSTRACT

A One Number Link You ONLY number is assigned to each subscriber, which identifies the subscriber exclusively. The said subscriber can be an IP subscriber or an ordinary PSTN subscriber. An ONLY Service Server and an ONLY User Server are configured, any ONLY service call initiated by a PSTN subscriber or an IP network subscriber is transmitted to the ONLY Server, and through cooperation between the Service ONLY Server and the ONLY User Server, the call connection control is carried out according to the call control strategy customized by the subscriber in advance, to implement communication between PSTN and IP network subscribers. If the call fails, a new call can be initiated automatically according to the call control strategy list customized by the subscriber in advance. Problems in number, charging, mapping of numbers and subscriber displacement in communication between the PC subscribers and the common phone subscribers can be easily solved.

23 Claims, 10 Drawing Sheets

U.S. PATENT DOCUMENTS

| | | | |
|---|---|---|---|
| 6,792,084 B1* | 9/2004 | Gross et al. | 379/88.04 |
| 6,795,532 B1* | 9/2004 | Gross et al. | 379/88.01 |
| 6,870,909 B2* | 3/2005 | Gross et al. | 379/88.22 |
| 6,931,116 B1* | 8/2005 | Gross et al. | 379/211.03 |
| 7,088,801 B1* | 8/2006 | Gross et al. | 379/67.1 |
| 2002/0172333 A1* | 11/2002 | Gross et al. | 379/88.22 |
| 2004/0105535 A1* | 6/2004 | Gross et al. | 379/201.01 |
| 2004/0170257 A1* | 9/2004 | Gross et al. | 379/67.1 |
| 2004/0208305 A1* | 10/2004 | Gross et al. | 379/211.01 |

FOREIGN PATENT DOCUMENTS

| | | |
|---|---|---|
| KR | 2001061005 A | 7/2001 |
| WO | WO 0171994 A1 | 9/2001 |

* cited by examiner

IMPLEMENTATION METHOD AND SYSTEM OF THE PERSONAL NUMBER SERVICE THAT SYNCRETIZES THE PHONE NETWORK USER AND IP NETWORK USER

FIELD OF THE TECHNOLOGY

The present invention generally relates to speech communication technology field and more particularly to a method and system for implementing ONLY service that syncretizes PSTN subscriber and IP network subscriber.

BACKGROUND OF THE INVENTION

Figure 1:
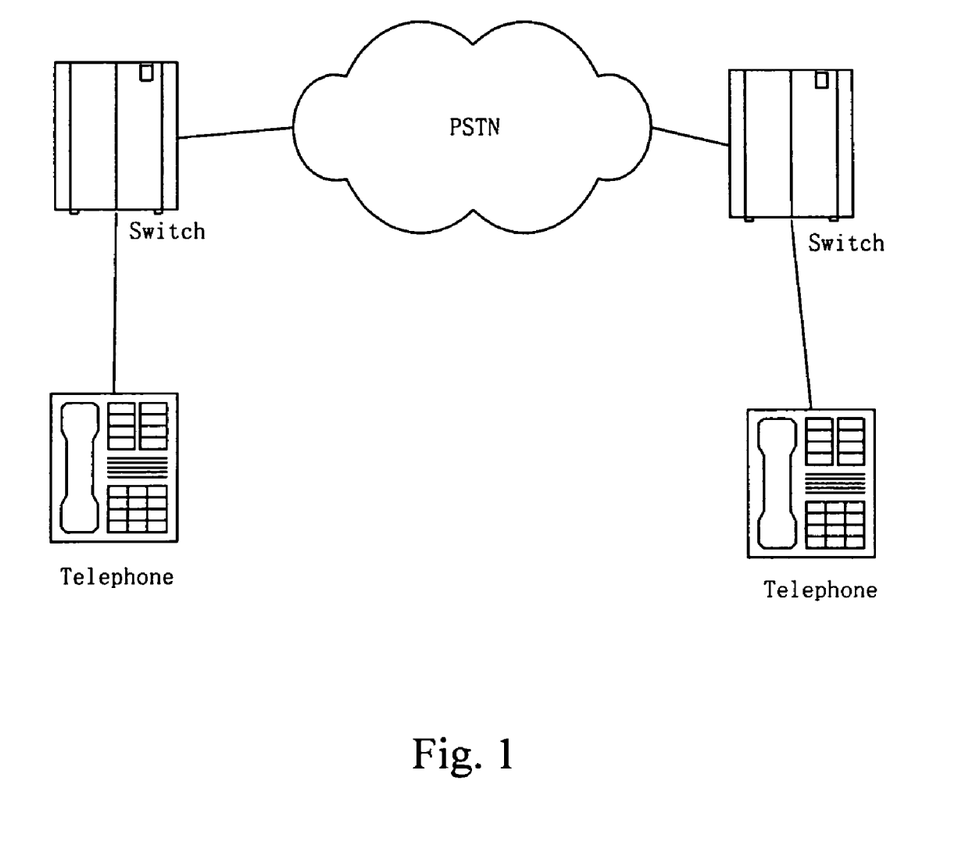
FIG. 1 is a schematic block diagram illustrating the PSTN architecture in traditional speech communication.

Traditional speech communication is mainly implemented via PSTN (Public Switch Telephone Network), which actually refers a Phone in common senses, and whose network architecture is as shown in FIG. 1.

With the development of Internet, communication through multimedia computers (PC) is becoming increasingly widespread; therefore, communication between PSTN subscribers and IP network subscribers has been an inevitable requirement. At present, there are two methods to syncretize both PSTN subscribers and IP subscribers.

1, PC to Phone: a telephone number is input at PC, whose software transmits the call to IP phone gateway which then initiates the call to PSTN, till the call finally reaches the called PSTN subscribers. In this manner, switch between IP network and PSTN network is implemented by gateway of the IP phone.

2, ICW (Internet Call Waiting): ICW is mainly used to overcome problems met when a dial-up subscriber receives a call while on-line. In this case, the subscriber should apply and register ICW service at telecom service registry office first. When the subscriber is online, his telephone number and IP address of his computer that is in use will be registered at a ICW service server by his ICW client software; once there is a inbound call to the subscriber, the call will be forwarded automatically to the ICW service server who will initiates the call to the registered IP address via gateway of the IP phone in accordance with the registered call forwarding on busy of ICW service; while the subscriber picks up the phone, communication could begin.

In a system where PSTN subscriber and IP subscriber is snycretized, problems of PC to Phone are easy to solve while the called telephone number can be directly inputted and nothing difficult left; but there will be little more difficulties for Phone to PC mainly because of no identification existing for the PC, even for a dial-up subscriber, his IP address is not fixed either. So it can be seen that the ICW service can merely solve part of the communication problems between PSTN subscribers and PC dial-up subscribers, no solution for communication problems between PSTN subscriber and all the PC subscribers is available.

Neither of the two services described above can provide a simple method to solve the communication problems between PSTN subscriber and PC subscriber; furthermore, there are still additional problems described as follows.

A subscriber may possess several phone numbers which make it difficult to remember and manage, especially a subscriber may use phone at one time, and use PC at another, which brings much troubles in finding him. In addition, various services are independent from each other and may possess their own charging systems, the difficulties in systematic management and payment also trouble the subscriber: when he is going on errands, his telephone number may be different, it will also be a question for other subscribers to find him.

SUMMARY OF THE INVENTION

The present invention provides a method and system for the ONLY service based on IP network, through which a number of services such as Phone to Phone, Phone to PC, PC to Phone, PC to PC and alike can be preferably syncretized, PSTN subscriber and PC subscriber can be syncretized together. In this way, communication problems in number, charging, mapping of numbers and subscriber displacement between PC subscribers and common PSTN subscribers can be easily solved.

The method for implementing a One Number Link You (ONLY) service which syncretizes a PSTN subscriber and an Internet Protocol IP network subscriber, comprises the steps of:

configuring a call number for the ONLY service that includes an access number and a personal number, wherein the personal number is a number that is assigned in advance and exclusive identification of a subscriber, and the personal number corresponds to a call control strategy including one or more contact numbers of the subscriber;

sending a call request package to transmit the personal number included in the call number of an ONLY service call when the ONLY service call is initiated to the subscriber by a PSTN subscriber or an IP network subscriber; receiving a call response package to obtain the call control strategy list corresponding to the personal number; wherein the call control strategy list stores the call control strategy including one or more contact numbers of the subscriber; inquiring about location and present state of the subscriber based on the personal number; and carrying out call connection control in accordance with the present state of the subscriber and the call control strategy list customized by the subscriber in advance.

Preferably, the present state of the subscriber includes present time and whether the subscriber is online or not; and the step of carryinci out the call connection control includes: transferring the ONLY service call to PC client software of the subscriber according to IP address and port number of the PC of the subscriber stored in the call control strategy list if the subscriber is online.

The call control strategy list is customized in advance through a browser provided by a Web Server, takes the personal number of the subscriber as an index, and stores in an ONLY User Server for providing subscriber management, charging management and customization of the call control strategy for the subscriber for a database of an Index Server that connects with the ONLY User Server.

In the ONLY service system that can syncretizes a PSTN subscriber and an IP network subscriber, a call number for an ONLY service that includes an access number and a personal number is configured, the personal number is a number that is assigned in advance and exclusive identification of a subscriber, and the personal number corresponds to a call control strategy including one or more contact numbers of the subscriber, and the ONLY service system includes:

an ONLY User Server, which provides subscriber management, charging management and a customization of the call control strategy for the subscriber; and an ONLY Service Server, to which an ONLY service call initiated by a PSTN subscriber or an IP network subscriber is connected, and which sends a call request package to transmit the personal number included in the call number of the ONLY service call when the ONLY service call is initiated by a PSTN subscriber or an IP network subscriber to the subscriber, receives a call response package to obtain the call control strategy list corresponding to the personal number; inquiries about location and present state of the subscriber based on the personal number and carries out call connection control in accordance with the present state of the subscriber and the call control strategy;

wherein the call control strategy list stores the call control strategy including one or more contact numbers of the subscriber.

According to the ONLY service system, wherein further includes an Index Server, which connects with the ONLY User Server, and stores present state of the subscriber, and the call control strategy.

According to the ONLY service system, wherein the ONLY Service Server at least includes:

a Call Control Module used for service control and call control;

an H.323 protocol stack manipulation module that handles an H.323 protocol between interfaces and the Call Control Module;

a Media Gateway Control (MGC) Command Module that carries out a conversion between an upper layer message and a MGCP protocol;

a Media Gateway Control (MGC) Adaption Module used for an adaption of a message format between the MGC Command Module and the Call Control Module;

a User Client Module for implementing communication between the ONLY Service Server and the ONLY User Server;

a Media Gateway Control (MGC) Management Module for resource management and allocation; and a Configure Management Module that is used for variable configuration and maintenance of a system log.

According to the ONLY service system, wherein the ONLY User Server at least includes:

an ONLY Service Server package processing module, which is responsible for interacting with the ONLY Service Server, responding a call request of the ONLY Service Server, feeding back the call control strategy of the subscriber, implementing authentication and charging functions;

a PC client package processing module, which interacts with PC clients, and registers, searches, modifies and deletes information of the subscriber.

According to the ONLY service system, wherein further includes an Interactive Voice Response Media Server, which connects with the ONLY Service Server to provide interactive voice response services to the subscribers.

According to the ONLY service system, wherein further includes a Voice Message Media Server, which connects with the ONLY Service Server to provide voice mailbox function in the IP network.

According to the ONLY service system, wherein further includes a FAX Store and Forward Media Server, which connects with the ONLY Service Server and receives fax data from the PSTN subscriber or the IP subscriber, and forwards the data by means of E-mail or ordinary fax.

According to the ONLY service system, wherein further including a Resident Gateway, which connects with the ONLY Service Server and provides multiplex interfaces that can connect ordinary telephone set.

According to the ONLY service system, wherein further including:

an Interactive Voice Response Media Server, which connects with the ONLY Service Server to provide interactive voice response service to the subscribers;

a Voice message Media Server, which connects with the ONLY Service Server to provide voice mailbox function in the IP network;

a FAX Store and Forward Media Server, which connects with the ONLY Service Server and receives fax data from the PSTN subscriber or the IP subscriber, and forwards the data by means of E-mail or ordinary fax;

a Resident Gateway, which connects with the ONLY Service Server to provide multiplex interfaces that can connect ordinary telephone set.

Preferably, the present state of the subscriber includes present time and whether the called subscriber is online or not; the ONLY Service Server transfers the ONLY service call to PC client software of the subscriber according to IP address and port number of the PC of the subscriber stored in the call control strategy list if the subscriber is online.

A One Number Link You (ONLY) service system that can syncretize a Public Switch Telephone Network (PSTN) subscriber and an Internet Protocol (IP) network subscriber, in which a call number for an ONLY service that includes an access number and a personal number is configured, the personal number is a number that is assigned in advance and exclusive identification of a subscriber, and the personal number corresponds to a call control strategy including one or more contact numbers of the subscriber, includes:

an ONLY User Server, which provides subscriber management, charging management and customization of the call control strategy for the subscriber; and an ONLY Service Server, to which an ONLY service call initiated by a PSTN subscriber or an IP network subscriber to the subscriber is connected, and which obtains the call control strategy corresponding to the personal number included in the call number of the ONLY service call and carries out call connection control in accordance with the call control strategy;

where the ONLY Service Server at least includes:

a Call Control Module used for service control and call control;

an H.323 protocol stack manipulation module that handles an H.323 protocol between interfaces and the Call Control Module;

a Media Gateway Control (MGC) Command Module that carries out a conversion between an upper layer message and a Media Gateway Control protocol (MGCP);

a Media Gateway Control (MGC) Adaption Module used for an adaption of a message format between the MGC Command Module and the Call Control Module;

a User Client Module for implementing communication between the ONLY Service Server and the ONLY User Server;

a Media Gateway Control (MGC) Management Module for resource management and allocation; and a Configure Management Module that is used for variable configuration and maintenance of a system log.

A One Number Link You (ONLY) service system that can syncretize a Public Switch Telephone Network (PSTN) subscriber and an Internet Protocol (IP) network subscriber, in which a call number for an ONLY service that includes an access number and a personal number is configured, the personal number is a number that is assigned in advance and exclusive information of a subscriber, and the personal number corresponds to a call control strategy including one or more contact numbers of the subscriber, includes:

an ONLY User Server, which provides subscriber management, charging management and customization of the call control strategy for the subscriber;

an ONLY Service Server, to which an ONLY service call initiated by a PSTN subscriber or an IP network subscriber to the subscriber is connected, and which obtains the call control strategy corresponding to the personal number included in the call number of the ONLY service call and carries out call connection control in accordance with the call control strategy; and an Index Server, which connects with the ONLY User Server, and stores information of the subscriber, or information of the subscriber and the call control strategy;

where the ONLY Service Server at least includes;

a Call Control Module used for service control and call control;

an H.323 protocol stack manipulation module that handles an H.323 protocol between interfaces and the Call Control Module;

a Media Gateway Control (MGC) Command Module that carries out a conversion between an upper layer message and a Media Gateway Control protocol (MGCP);

a Media Gateway Control (MGC) Adaption Module used for an adaption of a message format between the MGC Command Module and the Call Control Module;

a User Client Module for implementing communication between the ONLY Service Server and the ONLY User Server;

a Media Gateway Control (MGC) Management Module for resource management and allocation; and a Configure Management Module that is used for variable configuration and maintenance of a system log.

In the technical scheme provided above according to the present invention, an exclusive ONLY number for each service subscriber with which the subscriber is identified, is distributed. The subscriber can be either PC subscriber or PSTN subscriber, and any ONLY connection initiated by PC subscribers or PSTN subscribers will be transferred to the ONLY server in accordance with the present invention. The call connection process is controlled through cooperation between the ONLY Service server and the ONLY User Server to ensure communication between the PSTN subscriber and PC subscriber. Once the call fails, a new call will be triggered according to the call control strategy customized in advance by the service subscriber. Through this process, problems on numbers, charging, mapping among several numbers, subscriber displacement and alike will be solved.

EMBODIMENTS OF THE INVENTION

According to the present invention, the four services including Phone to Phone, Phone to PC, PC to Phone and PC to PC are syncretized with personal number service, which is therefore vividly called ONLY (One Number Link You) service. Key of the service is that: distributing an exclusive personal number (i.e. ONLY number) systematically for each subscriber with which the subscriber is identified, no matter he is a PC subscriber or an ordinary PSTN subscriber; and according to the call control strategy customized by subscriber in advance, process of the connection is controlled via cooperation between the ONLY Service Server and ONLY User Server to ensure communications between the PSTN subscriber and PC subscriber.

The present invention will be described hereinafter with reference to the accompanying drawings and embodiments.

Figure 2:
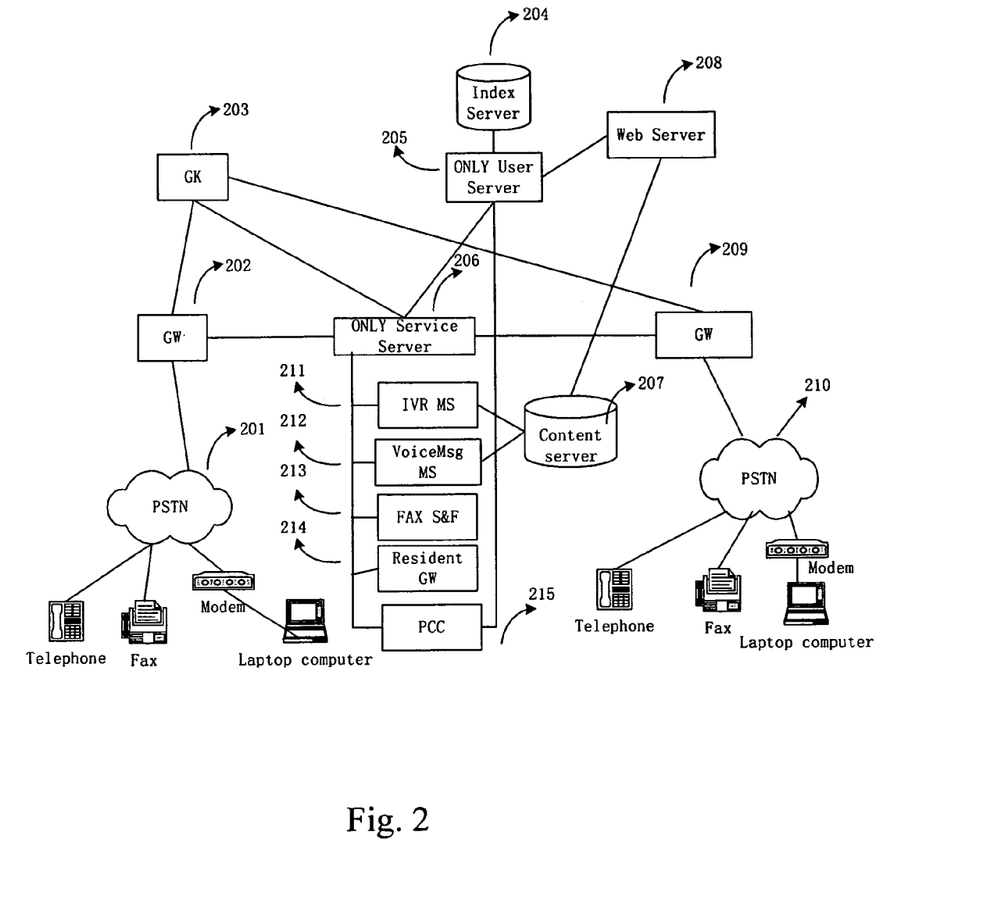
FIG. 2 is a schematic block diagram of the basic network architecture according to the present invention.

First, the schematic block diagram illustrating basic network architecture for implementing ONLY service as shown in the FIG. 2 will be checked.

A customer who want to apply for ONLY service can register online through a WEB page provided by Web Server 208, calling a Voice Service Center, or registering online via an agent. A ONLY service number may be "Access Number+personal number", which exclusively identify the customer, and is managed with a uniform database. Once a customer registers in the ONLY service, and get an exclusive ONLY number, for instance"166-12345678", then wherever the customer will be, whether online or not, he can be easily found through calling the ONLY service number.

Web Server 208 provides customers for registering, searching, modifying and deleting subscriber information by means of the WEB page.

Figure 3:
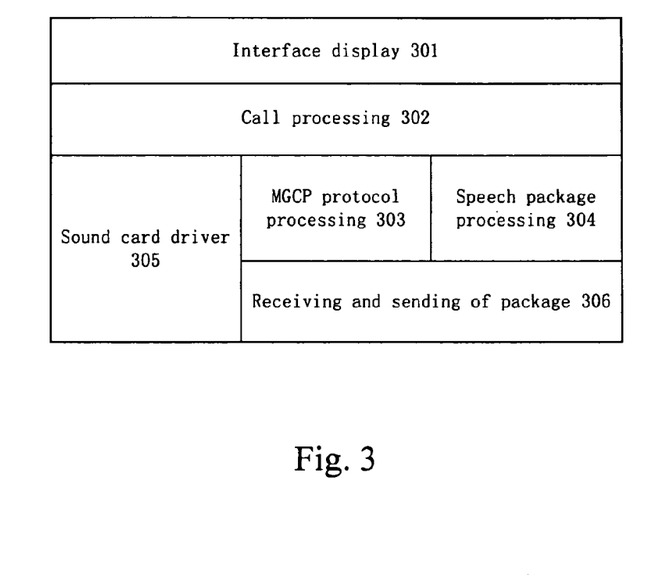
FIG. 3 is a schematic block diagram of the PC client software module according to the present invention.

PCC (PC Client) 215 is a client software module running in a PC, which can provide speech communication service to PC subscriber, and whose module structure is shown in FIG. 3. Wherein, package sending-and-receiving module 306 will carry out operations of sending and receiving of the Ethernet package. When it is a Media Gateway Control Protocol (MGCP) package, it will be transmitted to MGCP protocol processing module 303 for further process; if it is speech package, it will be sent to speech package-processing module 304 for further process. The call processing module 302 implements controlling and processing of the call, and controls sound card driver module 305 of the computer at same time to play and record the corresponding speech packages.

GW (Gateway) 202 is responsible for converting of speech and signaling between PSTN 201 and IP network. GK (Gatekeeper) 203 can realize functions such as access control, route search, bandwidth control and alike, which is mainly used to find corresponding called GW 210 through routing analysis based on the ONLY service number.

Interactive Voice Response Media Server (IVR MS) 211 can provide interactive voice response function in IP network. The server can receive keyboard and speech information input by the subscriber, and response accordingly for different applications, including the telephone banking function for instance.

Voice Message Media Server (Voice Msg MS) 212 can implement speech mailbox function in IP network.

FAX Store and Forward Media Server (FAX S&F) 213 can receive fax data from GW or other IP terminals, and then forward the data with appropriate means (i.e. E-mail, ordinary fax).

Resident Gateway (Resident GW) 214 provides phone lines that can connect with ordinary phones directly without switches and other devices alike installed.

ONLY Service Server 206 is responsible for call control in IP network, which functions like a switch in PSTN. The differences between these two means are that, the ONLY Service Server is in IP network and all the used techniques are pertinent with IP, and ONLY Service Server 206 deals with signaling only, not dealing with speech media flow.

In practice, no matter by a PSTN subscriber or a PC subscriber, once ONLY service number of the called service subscriber is dialed, the call will then be firstly connected to ONLY Service Server 206 who makes the subsequent connection operations. The connection control of all service subscribers are finished by ONLY Service Server 206, in this way, uniform management of the PSTN subscriber and PC subscriber can be guaranteed.

Simultaneously, ONLY Service Server 206 is responsible for interaction with ONLY User Server 205 for authentication and charging.

Figure 4:
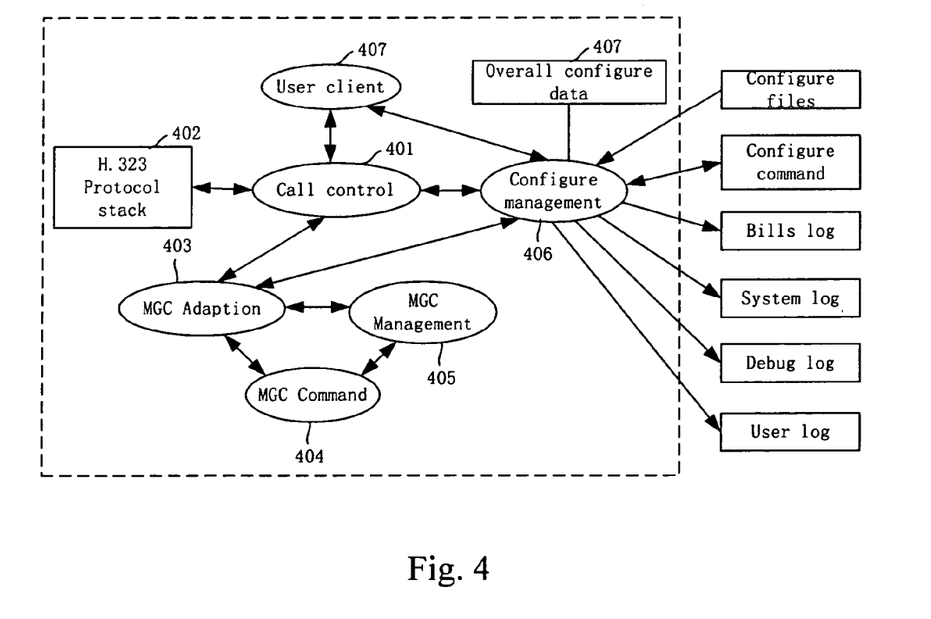
FIG. 4 is a schematic diagram illustrating internal module and data flow of the ONLY Service Server according to the present invention.

The schematic diagram illustrating internal module and data flow of the ONLY Service Server as shown in FIG. 4, wherein includes:

Call Control Module 401—implementing service control and call control of the ONLY Service Server. Wherein includes: access control; routing request; forwarding of call signaling; converting between different call protocols; transparent transmission of DTMF number; soft shut-down; limiting capacity of the call; accepting management from GK, and reporting state to the GK; informing ONLY User Server once the call sent to PCC subscriber fails; creating original charging information; and so on.

MGC Adaption Module(MGCA Module) 403—receiving MGCP package from the MGC Command Modules (MGCC Module) 404 below, and converting the package into Q931 package which is understandable for Call Control Module 401. MGCA module shields the details of MGCP protocol, provides a simple and uniform interface for Call Control Module 401, and simplifies the process of Call Control Module 401. Functions of the module may include accessing control, converting between different call protocols, transparent transmission of DTMF number, notification on requests and releases of the MS (Media Server) resources.

MGC Management Module (MGCM Module) 405—managing and allocating resources of the Media Gateway (MG comprises IVR and VM), and responsible for MG registering. Its functions may include MG registering; maintenance of MG state; MG resource management; call resource allocation; etc.

User Client Module 407—responsible for communications between ONLY Service Server and ONLY User Server. Wherein includes: logging on ONLY User Server when ONLY Service Server startups; log-off from ONLY User Server when ONLY Service Server stops running; keeping TCP links between ONLY Service Server and ONLY User Server using heartbeat package; calls searching; informing ONLY User Server when call fails; sending charging information; etc.

Configure Management Module (Config Management Module) 406—responsible for maintenance of configuring variables, writing subscriber log, system log and debugging log. Wherein includes: maintenance of configuring variables; writing subscriber log; writing system log; writing debugging log; writing bill log; writing statistic information; etc.

MGC Command Module (MGCC Module) 404—responsible for converting between upper layer information and MGCP protocol. Wherein includes: coding and encoding; resending of UDP data package when timeouts; sending-once-at-most function; associating MGC commands with its responses; etc.

H.323 protocol stack process module 402—receiving H.323 protocol package from interfaces, and transmitting to Call Control Module 401 after package processing; receiving process request from Call Control Module 401, and sending out after converting to H.323 protocol package; etc.

Figure 5:
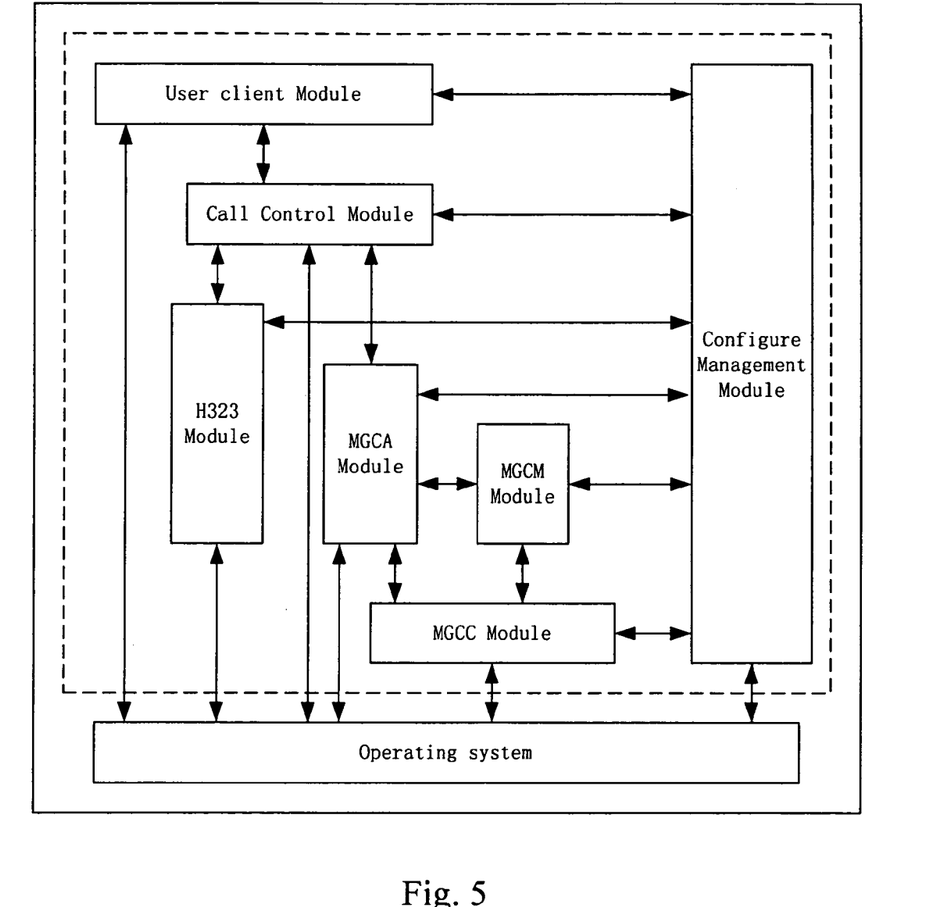
FIG. 5 shows interactive relationships between the modules in FIG. 4.

FIG. 5 shows interactive relationships among the above modules.

ONLY Service Server completes the conversion between H.323, SIP and MGCP protocol. H.323 protocol is adopted between ONLY Service Server and GW, and SIP or MGCP protocol is used between ONLY Service Server and IVR MS, VoiceMsg MS, Resident GW, Fax S&F, PCC.

Figure 6:
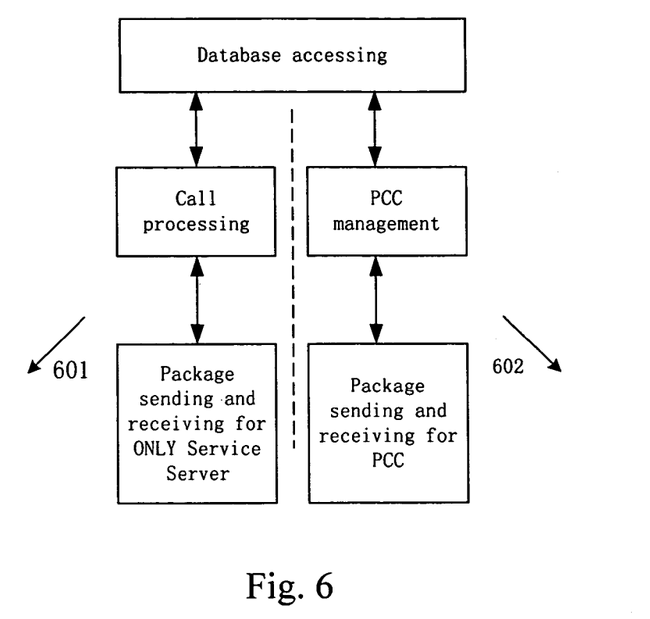
FIG. 6 is a schematic diagram illustrating system structure of the ONLY User Server according to the present invention.

The chart shown in FIG. 6 is a schematic diagram illustrating system structure of the ONLY User Server, which includes two parts based on the functions: processing module 601 for the ONLY Service Server package and processing module 602 for PCC package. Through interaction between the ONLY User Server and the PCC, operations such as registering, searching, modification and deleting can be finished. Authentication and charging can be implemented via interaction between the ONLY User Server and the ONLY Service Server. Because the call control strategy customized by the subscriber is stored in database, when a call is incoming, the ONLY Service Server will inquire the ONLY User Server in order to get the subscriber customized call style. If the called subscriber is a ordinary PSTN subscriber or mobile phone subscriber, the ONLY Service Server will call the IP phone gateway where the called subscriber locates; if the called subscriber is a PC client, the ONLY Service Server will call the called client directly; if a message needs to be left, the ONLY Service Server will transfer the call to voice mailbox. Database of the ONLY User Server may be built by an independent Index Server, which is a database system storing subscriber information and the call control strategy.

Figure 7:
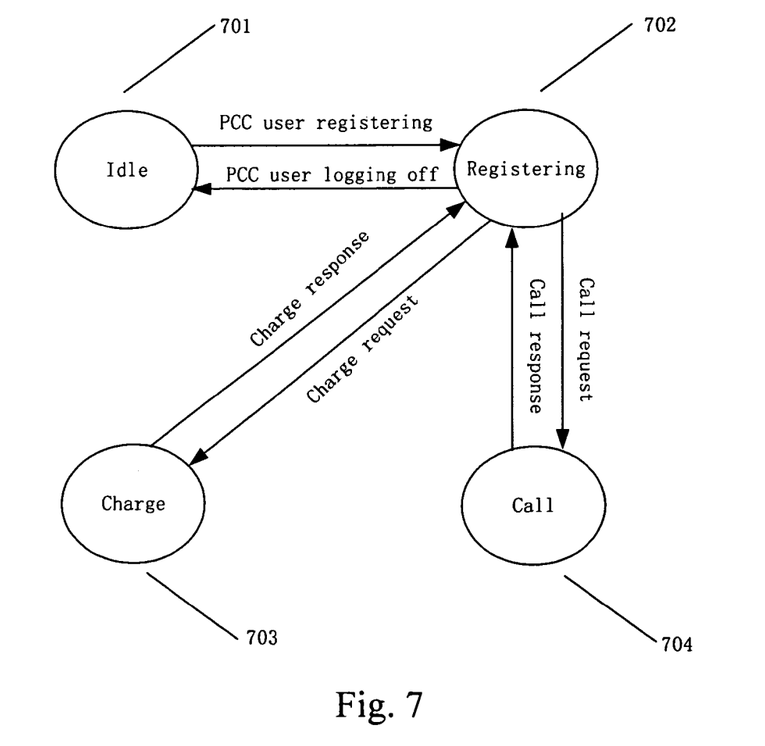
FIG. 7 illustrates state transference of the ONLY User Server.

FIG. 7 shows states transference of each ONLY service subscribers when there is interaction between ONLY Service Server and ONLY User Server, wherein turns from idle state 701 to registry state 702 when the subscriber registers, and returns idle state 701 when he logs off; the subscriber can enter charging state 703 after receiving charging requests, then return registry state 702 after sending charging responses; and enter call state 704 once receiving a call request, return registry state 702 after a call response is transmitted.

In the ONLY system shown in FIG. 2, ONLY Service Server 206 is responsible for controlling the connection process, and all the calls on the ONLY number will be routed to ONLY Service Server 206, after ONLY Service Server 206 sending requests to User Server205. ONLY User Server 205 captures the real telephone number or IP address that should be connected according to the present states and registry data stored in Index Server 204, and returns these information to ONLY Service Server 206 which initiates calls to the telephone number or IP address. ONLY User Server 205 may also return several telephone numbers or IP addresses, in this case, ONLY Service Server 206 will connect these numbers in turns when its connection attempt fails.

Figure 8:
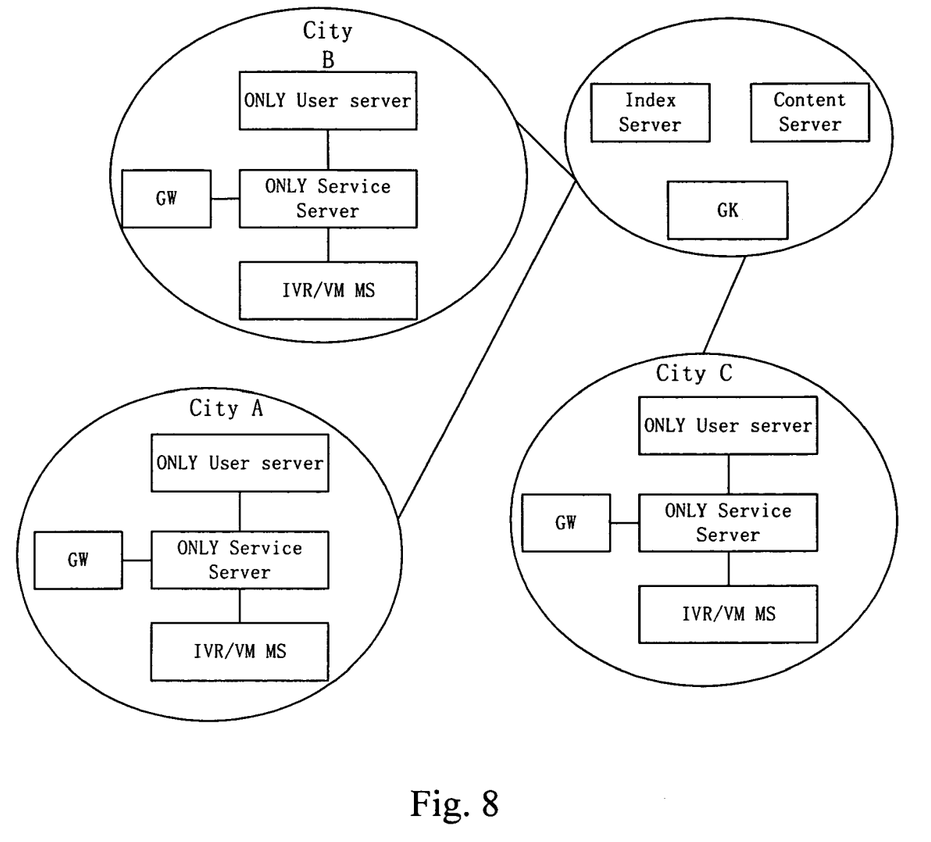
FIG. 8 illustrates the application of ONLY service in a large area according to the present invention.

As shown in FIG. 8, when the ONLY service applied in an area which includes several cities, a set of GW, ONLY Service Server, ONLY User Server, and IVR MS can be equipped in each city, one or more of these groupware can be installed based on the amount of the subscribers. The GK realizes routing function of the whole system and only one GK is installed. According to actual environments, the database systems such as Index Server and ONLY User Server may be either centralized as shown in FIG. 6, or configured as distributed database system in which all data is divided into several parts, and part of data is stored in each city respectively.

Each subscriber can register a personal number (ONLY number) according to ONLY service provide by the present invention. The number is an exclusive identification of the subscriber. The subscriber can register his contact number such as office telephone number, family phone number, mobile phone number, pager number and so on, and customize his call control strategy in advance. Registry methods that the subscriber adopted can be online registering and telephone registering or alike.

Calling subscriber can directly input ONLY service number of the called subscriber via ordinary phone or PC client software, after this, ONLY system will search for location and present state of the called subscriber which includes present time and whether the called subscriber is online or not; and then go on with the connection according to the prescribed call control strategy. For example, when the called subscriber is online, ONLY system transfers the call directly to his PC client software; otherwise, the call will be transferred to his office phone or mobile phone according to what he registered; if there is no contact number other than his voice mailbox available, the call will be transferred to the voice mailbox.

In the ONLY services provided by the present invention, a calling subscriber can be a PC subscriber, or PSTN subscriber who can enjoy same services; the called subscriber can also be a PC subscriber or PSTN subscriber, all of which depend on the present application state and registry data of the subscriber. In this manner, just with a single ONLY number, PC subscriber and PSTN subscriber could be synretized; meanwhile, the four kinds of services (Phone to Phone, Phone to PC, PC to Phone, PC to PC) can be also implemented.

For example, when calling subscriber is a PSTN subscriber, the connection process may include following steps.

1, gateway inquires GK to get information on the ONLY Service Server after receiving a call from the calling subscriber, and transmits the call information to the ONLY Service Server via IP network. The call information comprises phone number of calling and called subscribers, signaling transmission address of the calling subscriber.

2, The ONLY Service Server searches information of the called subscriber after transmitting the obtained calling and called phone number to the ONLY User Server. There is call control strategy stored in advance in the ONLY User Server or Index Server who connects with the ONLY User Server; the ONLY User Server expresses the call control strategy customized by the subscriber in a special style and saves in a call control strategy list, taking the ONLY number as index; and the ONLY User Server obtains the present call control strategy list by taking the ONLY number sent from ONLY Service Server as index, then transmits the list to the ONLY Service Server via IP network.

3, The ONLY Service Server receives and analyzes the call control strategy list. In the call control strategy list, the call control strategy customized in advance by the subscriber is stored, which comprises multiple optional information on a called terminal. Different terminal corresponds to different symbols of service types and relevant terminal information, for instance, terminal information of a PC may be its IP address and port number; the ONLY Service Server makes the call connection according to the call control strategy.

4, Call initiating processes may be different according to different service types. For example, when a call to PC is initiated, the ONLY Service Server will call the PC directly because the IP address and port number of the PC have been listed in the call control strategy list; if the called subscriber is a PSTN subscriber, the ONLY Service Server will inquire GK first to get IP address and port number of the called gateway, and then initiate the call; in the case of IVR or other media servers, the ONLY Service Server will need to get resource information of the media gateway through a special channel before initiating a call.

5, if a call fails, the ONLY Service Server will initiate call once again according to next item in the call control strategy list; the order of call transfers is same with order of the items in the call control strategy list; the call will be transferred in turn to the corresponding terminals, until it is accepted or the last item in the call control strategy list is selected.

Preferably, reference will be made in detail to the accompanying drawings of FIG. 9~FIG. 12 respectively hereinafter, to illustrate typical calling procedures of the ONLY service in accordance with the present invention.

Figure 9:
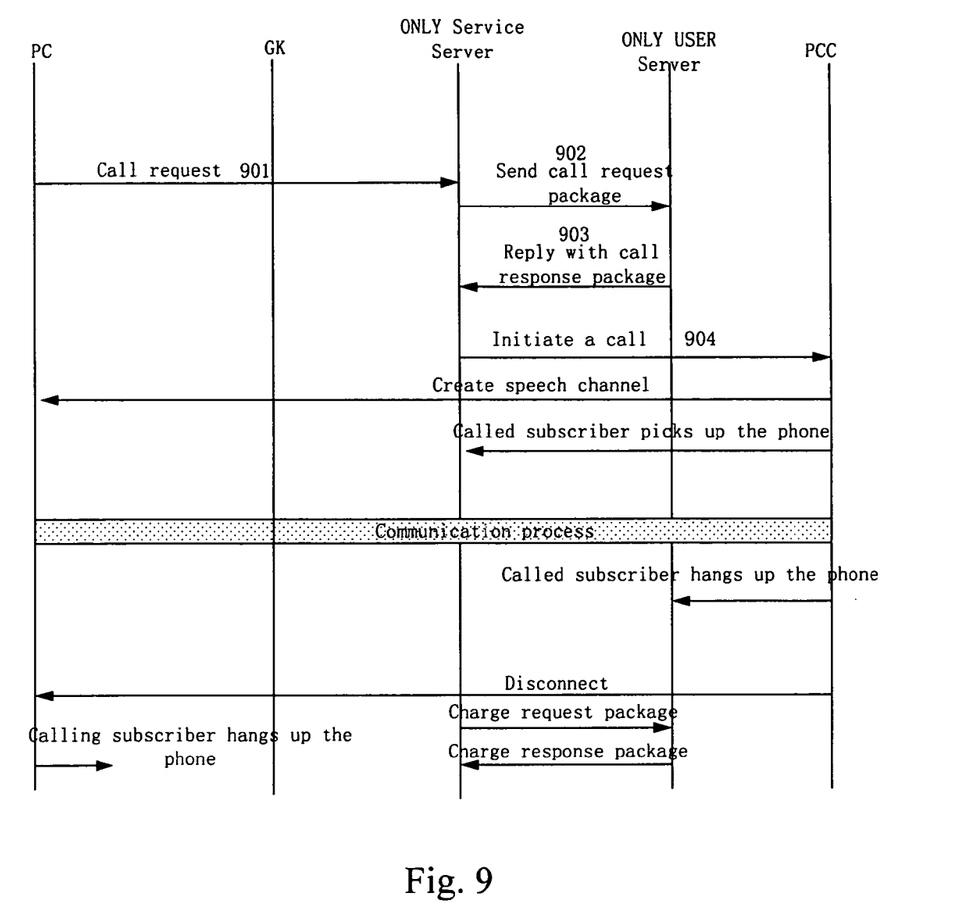
FIG. 9 is a schematic flow chart illustrating the calling process from PC to PC according to the present invention.
Figure 10:
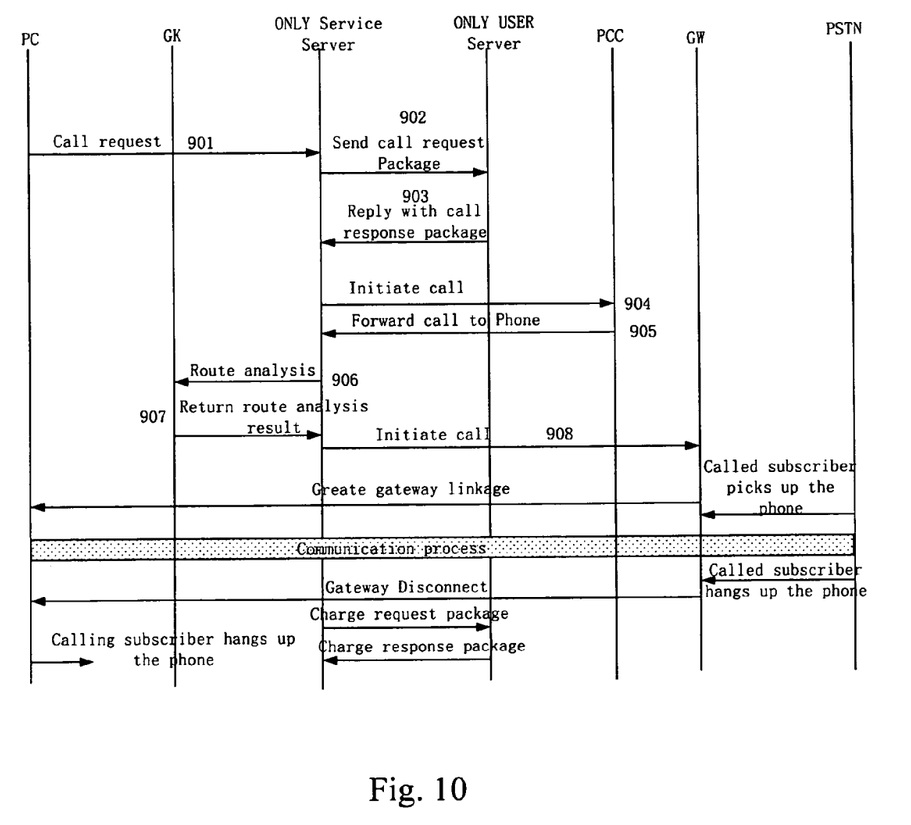
FIG. 10 is a schematic flow chart illustrating the calling process from PC to PC and then transmitted to phone.

As shown in FIG. 9 and FIG. 10, which are respectively the typical call procedures from PC to PC and from PC to PC then to Phone in the ONLY services.

901: PC subscriber inputs the ONLY service number of called ONLY service subscriber, and sends a call request to the ONLY Service Server.

902:The ONLY Service Server receives the call, then sends a call request package to the ONLY User Server, and transmits the ONLY number to the ONLY User Server for conversion.

903: The ONLY User Server replies with the call response package, and returns a call control strategy corresponding to the called ONLY number according to the call control strategy customized by the called subscriber in advance.

904:The ONLY Service Server initiates a call to PC client. When the call is transferred to Phone (905), the server sends routing analysis command to a GK (906) who returns address (907) of the called gateway, and then initiates the call to the called gateway (908).

Figure 11:
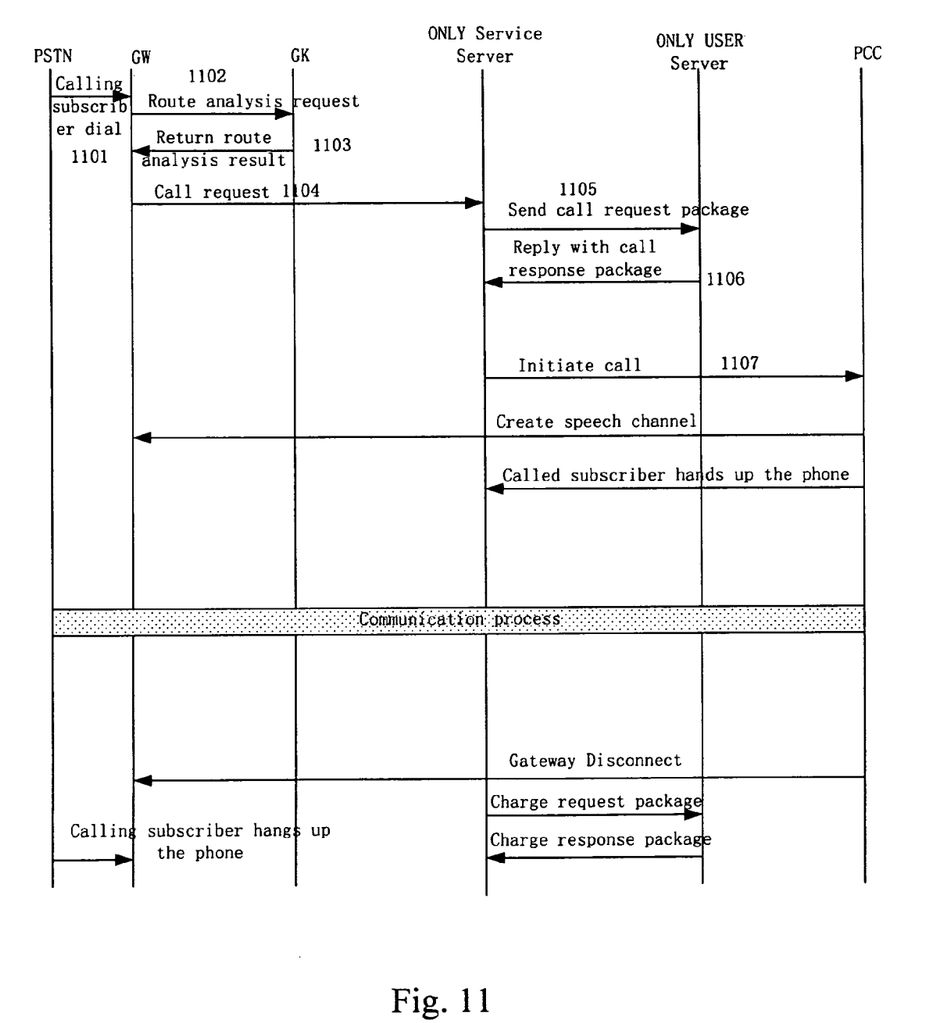
FIG. 11 is a schematic flow chart illustrating the calling process from Phone to PC according to the present invention.
Figure 12:
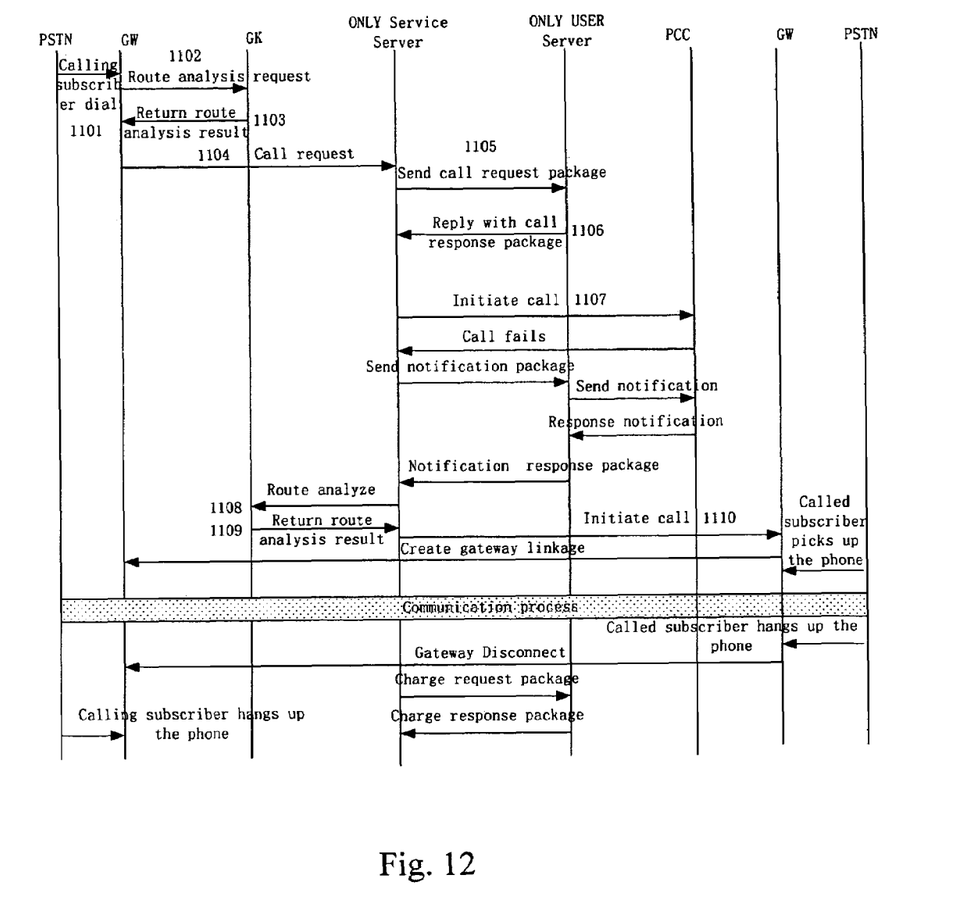
FIG. 12 is a schematic flow chart illustrating the calling process from Phone to PC and then transmitted to PC.

As shown in FIG. 11, FIG. 12, which is respectively the typical call procedures from Phone to PC and from Phone to PC and then to Phone in the ONLY services.

1101: The switch receives the ONLY service number of the called ONLY service subscriber dialed by a PSTN subscriber, and connects the call to a GW according to the preset route.

1102: The GW sends the ONLY number to a GK to ask for routing analysis after receiving the call.

1103: The GK returns result of routing analysis, which is IP address of the ONLY Service Server.

1104: The GW initiates the call to the ONLY Service Server.

1105: The ONLY Service Server sends a call request package to the ONLY User Server after receiving the call, and transmits the ONLY number to the ONLY User Server for number conversion.

1106: The ONLY User Server replies with the call response package, and returns the call control strategy list corresponding to the called ONLY number according to the call control strategy customized by the called subscriber in advance.

1107: The ONLY Service Server initiates a call to the PC client. When the call is transmitted to Phone, the server sends routing analysis command to the GK (1108) who returns routing analyzed address of the called gateway (1109), and then initiates the call to the called gateway (1110).

The advantages in the method according to the present invention is that: all the subscribers just possess of one ONLY number, no matter he is a PC subscriber or PSTN subscriber, online or in office, anyone who remembers the number can easily find him. Many problems such as number, charging, mapping of several numbers and displacement of the subscriber during communication between PC subscriber and ordinary PSTN subscriber can be solved by the method provided in accordance with the present invention.

Implementation of the ONLY service is independent from the network environment, which means it is available in different networks.

The invention claimed is:

1. A method for implementing a One Number Link You (Only) service which syncretizes a Public switch Telephone Network (PSTN) subscriber and an Internet Protocol (IP) network subscriber, comprising:
   configuring a call number for the ONLY service that includes an access number and a personal number, wherein the personal number is a number that is assigned in advance and exclusive identification of a subscriber, and the personal number corresponds to a call control strategy including at least one contact number of the subscriber;
   sending a call request package to transmit the personal number included in the call number of an ONLY service call when the ONLY service call is initiated to the subscriber by a PSTN subscriber or an IP network subscriber;
   receiving a call response package to obtain the call control strategy list corresponding to the personal number; wherein the call control strategy list stores the call control strategy including at least one contact number of the subscriber;
   inquiring about a location and a present state of the subscriber based on the personal number; and
   carrying out call connection control in accordance with the present state of the subscriber and the call control strategy list customized by the subscriber in advance.

2. The method according to claim 1, wherein the present state of the subscriber comprises a present time and whether the subscriber is online or not;
   the step of carrying out the call connection control comprises;
   transferring the ONLY service call to a PC client software application of the subscriber according to an IP address and a port number of the PC of the subscriber stored in the call control strategy list if the subscriber is online.

3. The method according to claim 2, wherein the call control strategy list is customized in advance through a browser provided by a Web Server, takes the personal number of the subscriber as an index, and stores in an ONLY User Server for providing subscriber management, charging management and customization of the call control strategy for the subscriber or a database of an Index Server that connects with the ONLY User Server.

4. The method according to claim 3, further comprising; providing a modification for the call control strategy list by means of the browser provided by the Web Server.

5. A One Number Link You (ONLY) service system that can syncretizes a Public Switch Telephone Network (PSTN) subscriber and an Internet Protocol (IP) network subscriber, in which a call number for an ONLY service that includes an access number and a personal number is configured, the personal number is a number that is assigned in advance and exclusive identification of a subscriber, and the personal number corresponds to a call control strategy including at least one contact number of the subscriber, comprising:
   an ONLY User Server, which provides subscriber management, charging management and customization of the call control strategy for the subscriber; and
   an ONLY Service Server, to which an ONLY service call initiated by a PSTN subscriber or an IP network subscriber to the subscriber is connected, and which sends a call request package to transmit the personal number included in the call number of the ONLY service call when the ONLY service call is initiated by a PSTN subscriber or an IP network subscriber to the subscriber, receives a call response package to obtain the call control strategy list corresponding to the personal number, inquires about location and present state of the subscriber based on the personal number, and carries out call connection control in accordance with the present state of the subscriber and the call control strategy;
   wherein the call control strategy list stores the call control strategy including at least one contact number of the subscriber.

6. The ONLY service system according to claim 5 further comprising an Index Server, which connects with the ONLY User Server, and stores a present state of the subscriber, and the call control strategy.

7. The ONLY service system according to claim 6, the ONLY Service Server at least comprises:
   a Call Control Module used for service control and call control;
   an H.323 protocol stack manipulation module that handles an H.323 protocol between interfaces and the Call Control Module;
   a Media Gateway Control (MGC) Command Module that carries out a conversion between an upper layer message and a Media Gateway Control protocol (MGCP);
   a Media Gateway Control (MGC) Adaption Module used for an adaption of a message format between the MGC Command Module and the Call Control Module;
   a User Client Module for implementing communication between the ONLY Service Server and the ONLY User Server;
   a Media Gateway Control (MGC) Management Module for resource management and allocation; and
   a Configure Management Module that is used for variable configuration and maintenance of a system log.

8. The ONLY service system according to claim 6, wherein the ONLY User Server at least comprises:
   an ONLY Service Server package processing module, which is responsible for interacting with the ONLY Service Server, responding a call request of the ONLY Service Server, feeding back the call control strategy of the subscriber, implementing authentication and charging functions;

a PC client package processing module, which interacts with PC clients, and registers, searches, modifies and deletes information of the subscriber.

9. The ONLY service system according to claim 6, further comprising an Interactive Voice Response Media Server, which connects with the ONLY Service Server to provide interactive voice response services to the subscribers.

10. The ONLY service system according to claim 6, further comprising a Voice Message Media Server, which connects with the ONLY Service Server to provide interactive voice mailbox function in the IP network.

11. The ONLY service system according to claim 6, further comprising a FAX Store and Forward Media Server, which connects with the ONLY Service Server and receives fax data from the PSTN subscriber or the IP subscriber, and forwards the data by means of E-mail or ordinary fax.

12. The ONLY service system according to claim 6, further comprising a Resident Gateway, which connects with the ONLY Service Server and provides multiplex interfaces that can connect ordinary telephone set.

13. The ONLY service system according to claim 6, further comprising:
an Interactive Voice Response Media Server, which connects with the ONLY Service Server to provide interactive voice response service to the subscribers;
a Voice message Media Server, which connects with the ONLY Service Server to provide voice mailbox function in the IP network;
a FAX Store and Forward Media Server, which connects with the ONLY Service Server and receives fax data from the PSTN subscriber or the IP subscriber, and forwards the data by means of E-mail or ordinary fax;
a Resident Gateway, which connects with the ONLY Service Server to provide multiplex interfaces that can connect ordinary telephone set.

14. The ONLY service system according to claim 5, wherein the ONLY Service Server at least comprises:
a Call Control Module used for service control and call control;
an H.323 protocol stack manipulation module that handles an H.323 protocol between interfaces and the Call Control Module;
a Media Gateway Control (MGC) Command Module that carries out a conversion between an upper layer message and a Media Gateway Control protocol (MGCP);
a Media Gateway Control (MGC) Adaption Module used for an adaption of a message format between the MGC Command Module and the Call Control Module;
a User Client Module for implementing communication between the ONLY Service Server and the ONLY User Server;
a Media Gateway Control (MGC) Management Module for resource management and allocation; and
a Configure Management Module that is used for variable configuration and maintenance of a system log.

15. The ONLY service system according to claim 5, wherein the ONLY User Server at least comprises:
an ONLY Service Server package processing module, which is responsible for interacting with the ONLY Service Server, responding a call request of the ONLY Service Server, feeding back the call control strategy of the subscriber, implementing authentication and charging functions;

a PC client package processing module, which interacts with PC clients, and registers, searches, modifies and deletes information of the subscriber.

16. The ONLY service system according to claim 5, further comprises an Interactive Voice Response Media Server, which connects with the ONLY Service Server to provide interactive voice response services to the subscribers.

17. The ONLY service system according to claim 5, further comprises a Voice Message Media Server, which connects with the ONLY Service Server to provide voice mailbox function in the IP network.

18. The ONLY service system according to claim 5, further comprises a FAX Store and Forward Media Server, which connects with the ONLY Service Server and receives fax data from the PSTN subscriber or the IP subscriber, and forwards the data by means of E-mail or ordinary fax.

19. The ONLY service system according to claim 5, further comprising a Resident Gateway, which connects with the ONLY Service Server and provides multiplex interfaces that can connect ordinary telephone set.

20. The ONLY service system according to claim 5, further comprising:
an Interactive Voice Response Media Server, which connects with the ONLY Service Server to provide interactive voice response service to the subscribers;
a Voice message Media Server, which connects with the ONLY Service Server to provide voice mailbox function in the IP network;
a FAX Store and Forward Media Server, which connects with the ONLY Service Server and receives fax data from the PSTN subscriber or the IP subscriber, and forwards the data by means of E-mail or ordinary fax;
a Resident Gateway, which connects with the ONLY Service Server to provide multiplex interfaces that can connect ordinary telephone set.

21. The ONLY service system according to claim 5, wherein the present state of the subscriber comprises a present time and whether the called subscriber is online or not; and
the ONLY Service Server transfers the ONLY service call to a PC client software application of the subscriber according to an IP address and a port number of the PC of the subscriber stored in the call control strategy list if the subscriber is online.

22. A One Number Link You (ONLY) service system that can syncretize a Public Switch Telephone Network (PSTN) subscriber and an Internet Protocol (IP) network subscriber, in which a call number for an ONLY service that includes an access number and a personal number is configured, the personal number is a number that is assigned in advance and exclusive identification of a subscriber, and the personal number corresponds to a call control strategy including one or more contact numbers of the subscriber, comprising:
an ONLY User Server, which provides subscriber management, charging management and customization of the call control strategy for the subscriber; and
an ONLY Service Server, to which an ONLY service call initiated by a PSTN subscriber or an IP network subscriber to the subscriber is connected, and which obtains the call control strategy corresponding to the personal number included in the call number of the ONLY service call and carries out call connection control in accordance with the call control strategy;
wherein the ONLY Service Server at least comprises:
a Call Control Module used for service control and call control;

an H.323 protocol stack manipulation module that handles an H.323 protocol between interfaces and the Call Control Module;

a Media Gateway Control (MGC) Command Module that carries out a conversion between an upper layer message and a Media Gateway Control protocol (MGCP);

a Media Gateway Control (MGC) Adaption Module used for an adaption of a message format between the MGC Command Module and the Call Control Module;

a User Client Module for implementing communication between the ONLY Service Server and the ONLY User Server;

a Media Gateway Control (MGC) Management Module for resource management and allocation; and a Configure Management Module that is used for variable configuration and maintenance of a system log.

23. A One Number Link You (ONLY) service system that can syncretize a Public Switch Telephone Network (PSTN) subscriber and an Internet Protocol (IP) network subscriber, in which a call number for an ONLY service that includes an access number and a personal number is configured, the personal number is a number that is assigned in advance and exclusive identification of a subscriber, and the personal number corresponds to a call control strategy including one or more contact numbers of the subscriber, comprising:

an ONLY User Server, which provides subscriber management, charging management and customization of the call control strategy for the subscriber;

an ONLY Service Server, to which an ONLY service call initiated by a PSTN subscriber or an IP network subscriber to the subscriber is connected, and which obtains the call control strategy corresponding to the personal number included in the call number of the ONLY service call and carries out call connection control in accordance with the call control strategy; and an Index Server, which connects with the ONLY User Server, and stores information of the subscriber, or information of the subscriber and the call control strategy;

wherein the ONLY Service Server at least comprises;

a Call Control Module used for service control and call control;

an H.323 protocol stack manipulation module that handles an H.323 protocol between interfaces and the Call Control Module;

a Media Gateway Control (MGC) Command Module that carries out a conversion between an upper layer message and a Media Gateway Control protocol (MGCP);

a Media Gateway Control (MGC) Adaption Module used for an adaption of a message format between the MGC Command Module and the Call Control Module;

a User Client Module for implementing communication between the ONLY Service Server and the ONLY User Server;

a Media Gateway Control (MGC) Management Module for resource management and allocation; and a Configure Management Module that is used for variable configuration and maintenance of a system log.

* * * * *